US012223073B2

(12) United States Patent
Golan et al.

(10) Patent No.: US 12,223,073 B2
(45) Date of Patent: Feb. 11, 2025

(54) DATABASE MANAGEMENT ENGINE FOR A DATABASE MANAGEMENT SYSTEM

(71) Applicant: MICROSOFT TECHNOLOGY LICENSING, LLC, Redmond, WA (US)

(72) Inventors: Oron Golan, Meitar Halamish (IL); Aviram Fireberger, Karmia (IL); Aviad Pines, Jerusalem (IL); Adir Atias, Migdal Ha'Emek (IL); Evgeny Lutsky, Tel-Aviv (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 448 days.

(21) Appl. No.: 17/567,022

(22) Filed: Dec. 31, 2021

(65) Prior Publication Data
US 2023/0214511 A1 Jul. 6, 2023

(51) Int. Cl.
*G06F 21/62* (2013.01)
*G06F 11/14* (2006.01)

(52) U.S. Cl.
CPC ...... *G06F 21/6218* (2013.01); *G06F 11/1469* (2013.01); *G06F 2201/84* (2013.01)

(58) Field of Classification Search
CPC ............. G06F 21/6218; G06F 11/1469; G06F 2201/84
See application file for complete search history.

(56) References Cited

U.S. PATENT DOCUMENTS 7,620,668 B2 11/2009 Kathuria et al.
10,803,196 B2 10/2020 Bodegas Martinez et al.
(Continued)

FOREIGN PATENT DOCUMENTS

EP 1089196 A2 4/2001

OTHER PUBLICATIONS

"Accelerate Innovation with the Commercial Marketplace", Retrieved from: https://web.archive.org/web/20210826102858/https:/azure.microsoft.com/en-us/marketplace/, Aug. 26, 2021, 5 Pages.
(Continued)

*Primary Examiner* — Alexander Lagor
*Assistant Examiner* — Zoha Piyadehghibi Tafaghodi
(74) *Attorney, Agent, or Firm* — Shook, Hardy & Bacon L.L.P.

(57) ABSTRACT

Methods, systems, and computer storage media provide a privacy compliance notification indicating a database's level of compliance with a privacy policy after restoring the database to the database's backup copy. The database is associated with a database management engine. The database supports privacy-based first-class data entities. The privacy-based first-class data entities are database entities having privacy system-level metadata properties associated with data operations in a database language syntax. The privacy compliance notification may be generated based on determining whether a privacy database operation associated with a database journal and a privacy journal has been executed on a database since the database was restored to a backup copy of the database. The database transaction journal includes a transaction log of database operations executed against the database, and the privacy journal includes the database operations logged as privacy database operations associated with the plurality of privacy-based first-class data entities.

20 Claims, 10 Drawing Sheets

(56) References Cited

U.S. PATENT DOCUMENTS

| | | | |
|---|---|---|---|
| 2016/0306709 A1* | 10/2016 | Shaull | G06F 16/219 |
| 2020/0057864 A1 | 2/2020 | Parthasarathy | |
| 2020/0167240 A1* | 5/2020 | Haridas | G06F 11/1453 |
| 2020/0257594 A1 | 8/2020 | Tobias et al. | |
| 2020/0380160 A1 | 12/2020 | Kraus et al. | |
| 2021/0026982 A1 | 1/2021 | Amarendran et al. | |
| 2021/0034585 A1 | 2/2021 | Downs et al. | |
| 2021/0081432 A1* | 3/2021 | Grunwald | G06F 16/273 |
| 2021/0099461 A1 | 4/2021 | Schwartz et al. | |
| 2023/0195926 A1* | 6/2023 | Mehta | G06F 21/6245 |
| | | | 726/1 |

OTHER PUBLICATIONS

"Azure Information Protection", Retrieved from: https://web.archive.org/web/20210826103222/https:/azure.microsoft.com/en-us/services/information-protection/, Aug. 26, 2021, 4 Pages.

"Azure Policy", Retrieved from: https://web.archive.org/web/20210826103829/https:/azure.microsoft.com/en-us/services/azure-policy/, Aug. 26, 2021, 6 Pages.

"Azure Security Center", Retrieved from: https://web.archive.org/web/20210826102617/https:/azure.microsoft.com/en-us/services/security-center/, Aug. 26, 2021, 9 Pages.

"GDPR Data Backup Requirements", Retrieved from: https://www.compliancejunction.com/gdpr-data-backup-requirements/, Apr. 20, 2018, 3 Pages.

"How to Keep Your Data Backup GDPR Compliant", Retrieved from: https://www.softwareone.com/en/blog/all-articles/2018/08/09/how-to-keep-your-data-backup-gdpr-compliant, Jul. 28, 2021, 7 Pages.

"How To Use Import-Export Command and CSV Files in GDPR Guard", Retrieved from: https://www.veritas.com/support/en_US/article.100044194, Oct. 30, 2018, 5 Pages.

"Application as Filed in U.S. Appl. No. 15/931,020", Filed Date: May 13, 2020, 62 Pages.

Bozhidar, Plamenov B., "GDPR—A Practical Guide For Developers", Retrieved from: https://techblog.bozho.net/gdpr-practical-guide-developers/, Nov. 29, 2017, 28 Pages.

Griffee, et al., "Microsoft Compliance Manager (Classic)", Retrieved from: https://web.archive.org/web/20210524144356/https://docs.microsoft.com/en-us/microsoft-365/compliance/meet-data-protection-and-regulatory-reqs-using-microsoft-cloud?view=o365-worldwide, Mar. 17, 2021, 51 Pages.

Masek, et al., "SAP Business Objects in the Era of GDPR 10 Steps to Ensure and Maintain Compliance", Retrieved from: https://360suite.io/wp-content/uploads/2020/02/360suite-Whitepaper-BusinessObjects-In-The-Era-Of-GDPR-10-Steps-To-Ensure-And-Maintain-Compliance.pdf, Retrieved on: Aug. 26, 2021, 16 Pages.

Politou, et al., "Backups and the Right to be Forgotten in the GDPR: An Uneasy Relationship", In Journal of Computer Law & Security Review, vol. 34, Issue 6, Sep. 8, 2018, pp. 1-11.

Staimer, Marc, "Are You Ready to Comply with GDPR Requirements?", Retrieved from: https://searchdatabackup.techtarget.com/feature/Are-you-ready-to-comply-with-GDPR-requirements, Feb. 12, 2018, 6 Pages.

"GDPR + Backup and Restore", Retrieved from: https://www.reddit.com/r/gdpr/comments/7f3g3i/gdpr_backup_and_restore/, Nov. 24, 2017, 2 Pages.

"International Search Report and Written Opinion Issued in PCT Application No. PCT/US22/051891", Mailed Date: Apr. 18, 2023, 12 Pages.

* cited by examiner

DATABASE MANAGEMENT ENGINE FOR A DATABASE MANAGEMENT SYSTEM

BACKGROUND

Users rely on applications and services to facilitate control of data stored in various data repositories (e.g., a database). Distributed computing systems (e.g., cloud computing platforms) host database management systems that support network access to data. A database management system (DBMS) can be part of an information management system in a distributed computing system that provides different types of data control tools enabling create, read, update, and/or delete (CRUD) operations. The DBMS can operate as part of the information management system to provide data storage, management, migration, orchestration, and manipulation services. In particular, the DBMS performs computing tasks to facilitate database compliance with various enterprise, department, or government regulatory privacy policies. For example, DBMS support database operations including user-initiated delete operations and requests to remove privacy data requested to be removed by the user.

Conventionally, database management systems are not configured with computing infrastructure and logic to support maintaining database compliance when a backup copy of the database is restored. For example, typically a DBMS is implemented to operationally restore a state of a database to a backup copy, without accounting for privacy-data-removal requests that post-date the time the backup was performed. The operational-backup-restoration model fails to ensure privacy compliance because privacy data is restored and not systematically identified or deleted when the backup copy of the database is restored. As such, a more comprehensive database management system—with an alternative basis for performing operations for facilitating privacy compliance—can improve computing operations and interfaces in database management systems.

SUMMARY

Various aspects of the technology described herein are generally directed to systems, methods, and computer storage media for, among other things, providing a privacy compliance notification. The privacy compliance notification is an indication of a database's level of compliance with a privacy policy. The privacy compliance notification can specifically be generated after restoring the database to a backup copy of the database. The privacy compliance notification can be a message associated with a software or hardware means and components for delivering the message. The privacy compliance notification may be generated based on determining whether a privacy database operation associated with a database journal and a privacy journal has been executed (i.e., re-executed) on a database since the database was restored to a backup copy of the database. The privacy database operation that has not been executed on the database since the database was restored to a backup copy of the database can be identified using the database transaction journal and the privacy journal.

Operationally, the database transaction journal includes a transaction log of database operations executed on or against the database. The privacy journal is separate from and smaller in size than the database transaction journal, such that the privacy journal may include a subset of information included in the database transaction journal. The database supports a plurality of privacy-based first-class data entity (i.e., first-class citizen in computing), which correspond to database entities having privacy system-level metadata properties associated with data operations in a database language syntax. By generating, and sending to a database administrator, the privacy compliance notification—based on identifying that a privacy database operation in the privacy journal has not been executed on the database since the database was restored to the backed up copy of the database—aspects of the disclosure allow for ensuring privacy compliance through a backup restoration operation in a computationally efficient manner. Specifically, aspects of the disclosure include leveraging privacy system-level metadata to identify, based on a comparison of the privacy journal to the database transaction journal of the restored backup copy, a privacy database operation that has not been executed on the backed up copy of the database.

Conventionally, database management systems are not configured with computing infrastructure and logic to support maintaining database compliance when a backup copy of the database is restored. A technical solution—to the limitations of conventional database management systems—provides a privacy compliance notification. The privacy compliance notification may be generated and include information based on identifying that a privacy database operation in the privacy journal has not been executed on the database since the database was restored to the backed up copy of the database. Accordingly, aspects of the disclosure allow for ensuring privacy compliance through a backup restoration operation in a computationally efficient manner.

In operation, a computing device may access, at a database management engine, a database that supports a plurality of privacy-based first-class data entities having privacy system-level metadata properties associated with data operations in a database language syntax. The computing device may execute, on the database, a database operation associated with a privacy-based first-class data entity and a privacy system-level metadata property. The computing device may record the database operation in the privacy journal based on executing the database operation. For example, the privacy journal is configured to log database operations as privacy database operations associated with the privacy-based first-class data entity and privacy system-level metadata. The computing device restores the database to a backup copy of the database, and based on the restoration, identifies, in the privacy journal, a privacy database operation that has not been executed (i.e., re-executed) on the database since the restore. Based on identifying the privacy database operation that has not been executed on the database since the restore, the computing device generates a privacy compliance notification associated with the database.

In addition, the database management system operates to access, at a database management engine, a database that supports a plurality of privacy-based first-class data entity. The privacy-based first-class data entities are database entities having privacy system-level metadata properties associated with data operations in data definition language syntax. The database management system operates to generate a backup copy of the database associated with a database transaction journal configured to log database operations and a privacy journal configured to log database operations as privacy database operations.

The database management system operates to execute, on the database, a database operation associated with a privacy-based first-class data entity and a privacy system-level metadata property. The database management system operates to, based on executing the database operation, record, in database transaction journal and the privacy journal, the database operation. The database operation is recorded in the privacy journal as a privacy database operation. The database management system also operates to detect an error in the database, and based on detecting the error in the database, restore the database to a backup copy of the database. The database management system further operates to, based on restoring the database to the backup copy, determine whether any privacy database operations have not been executed on the database since the restore. The database management system determines that a privacy database operation has not been executed and generates a privacy compliance notification associated with the database based on determining that the privacy database operation has not been executed on the database since the restore.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Figure 1A:
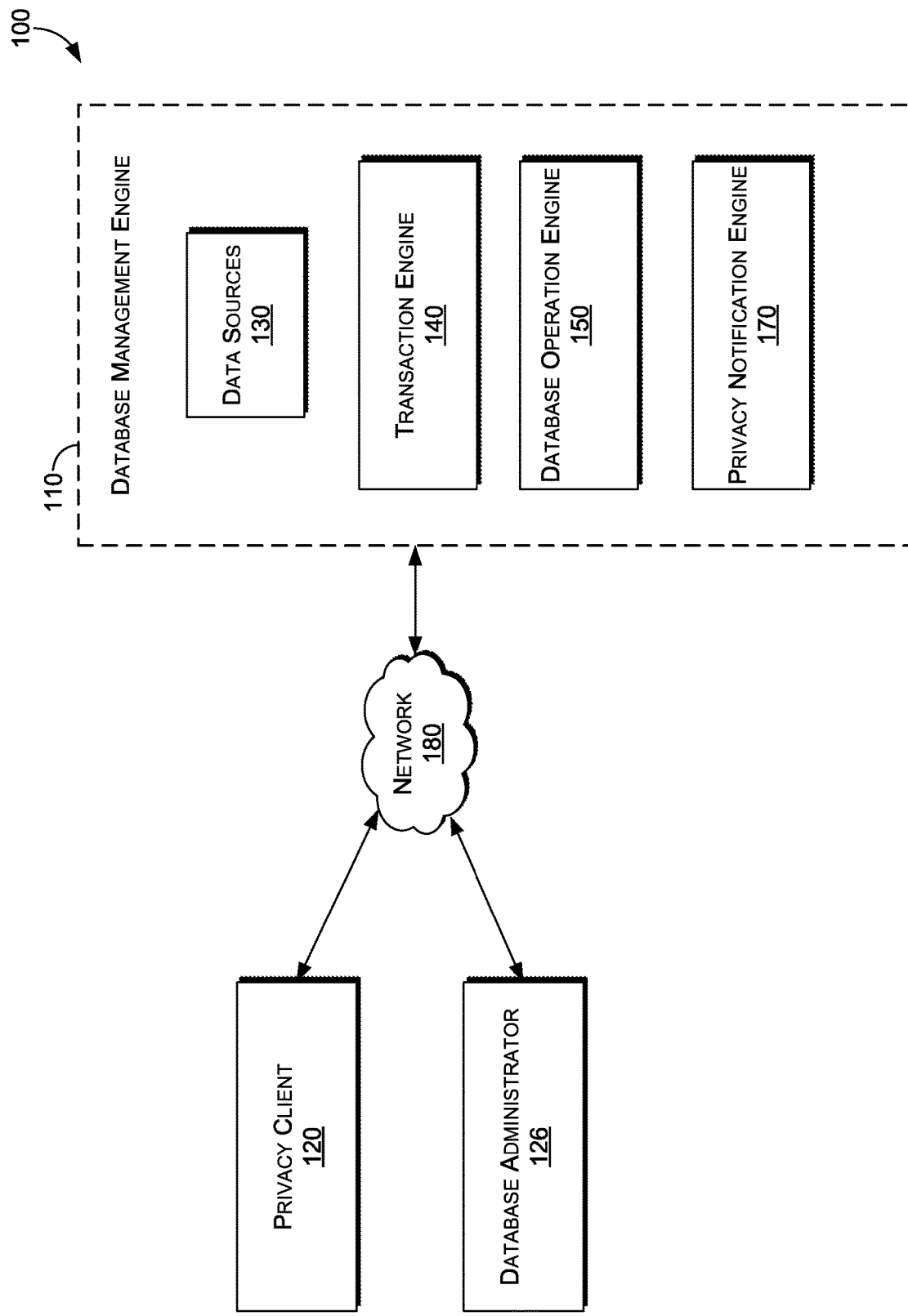
FIG. 1A is a block diagram of an exemplary database management system for generating a privacy compliance notification used to determine compliance with a privacy policy using a database management engine of the database management system, in accordance with aspects of the technology described herein.

Overview of Technical Problems, Technical Solutions, and Technological Improvements Database management systems operate within an information management system to provide data storage, management, migration, orchestration, and manipulation services. In particular, database management systems perform computing tasks to facilitate database compliance with various enterprise, department, or government regulatory privacy policies. For example, database management systems support database operations including processing user-initiated delete operations to remove privacy data requested to be removed by the user. Conventionally, database management systems are not configured with computing logic to handle facilitating the continuing maintenance of database compliance when a back-up is executed and when the removal of certain privacy data is later requested.

As used herein, a "privacy policy" may refer to a set of rules or regulations for governing data. The privacy policy may be data-specific, user-specific, enterprise-specific, and so forth. For example, the California Consumer Privacy Act (CCPA) and the General Data Protection Regulation (GDPR) provide rules and regulations specific to specific regions of the world concerning the regulation and control of certain types of data. The privacy policy can include computing logic for meeting the rules or regulations associated with—by way of example—pseudonymisation and encryption of personal data; the ability to ensure the ongoing confidentiality, integrity, availability and resilience of processing systems and services; the ability to restore the availability and access to personal data in a timely manner in the event of a physical or technical incident; a process for regularly testing, assessing and evaluating the effectiveness of technical and organizational measures for ensuring the security of the processing. Ensuring compliance has become important in recent years to comply with customer requests regarding control of data and to avoid fees or sanctions associated with failing to comply with a privacy policy. Complying with a privacy policy through a backup restoration includes additional challenges, such as those discussed herein.

As used herein, "back-up," "performing a backup," "initiating a database backup storage operations," or "saving a backup copy of the database" may interchangeably refer to the process of creating a backup copy of a database by copying data records from the database (e.g., a Structured Query Language (SQL) Server database) or log records from a corresponding database transaction journal of transaction logs (herein referred to as "database transaction journal"). In response to initiating a backup, a backup copy of database at a particular instance in time from when the backup was initiated may be created. The backup copy may be used to restore and recover the data and associated database transaction journal, for example, when a user wants to restore the database to an earlier copy. The "database transaction journal" may refer to a transaction log including the database operations performed on a database, resulting in the corresponding copy or version of the database. In this manner, performing a "backup restoration operation" may restore the database as well as the corresponding database transaction journal to the backup copy associated with when the backup was performed.

Some conventional database management systems may initiate a complete database backup, a partial database backup, or a file backup. Moreover, a conventional database management system can initiate a differential backup restoration operation that is based on the latest complete backup of (1) a complete or partial database, or (2) a set of data files or file groups ("the differential base"), such that the differential backup restoration operation contains only modification associated with the data that has changed since the differential base. Although differential backup restoration operations are more efficient than a complete backup in that only data that has been modified since the previous backup restoration is replaced, even database management systems employing differential backup restoration operations do not provide computing logic or a computation model for addressing privacy policy compliance issues associated with the backup restoration operation restoring privacy data that a user previously requested to be removed.

Indeed, conventional database management systems are typically implemented to blindly restore a state of a data structure to that of a time a backup was completed, without accounting for database operations associated with privacy data that are communicated and/or executed after the time the backup was completed. The blind-backup-restoration model fails to ensure privacy policy compliance (e.g., by addressing or removing data that was restored as part of the backup restoration operation and that renders the database in breach of the privacy policy). To complete a backup, the blind-backup model causes data stored as part of the backup—including the privacy data previously requested to be removed after the date of the backup—to be restored.

One approach for facilitating database compliance with a privacy policy may include dedicating information-technology (IT) specialists to the task of ensuring database compliance with a privacy policy. These dedicated IT specialists may be burdened with manually parsing through data structures and databases to identify breaches of the privacy policy. However, this manual process of identifying breaches of privacy policy can be burdensome, inefficient, and result in data structures that fail to comply with the privacy policy being overlooked. In contrast to existing approaches, aspects of the present disclosure improve the efficiency of achieving database compliance with a privacy policy, and may reduce CPU cycles and reducing network bandwidth by automating the identification of privacy database operations.

Another existing approach to ensuring database compliance with a privacy policy may include giving customers (e.g., customers of a distributed computing system database solution) the freedom to manually tag data structures, such as a field and record of a relational database. However, burdening customers with the freedom to engage in privacy tagging management complexity may result in certain inefficiencies, inconsistencies, and erroneously tagged data, especially in view of an increasing lack of IT specialists capable of meeting the increasing demand in IT specialists. Moreover, IT specialists leaving enterprises or retiring may cause the privacy tagging management task to continuously shift to newer IT specialists who may be unaware of the organizational approaches used by the previous IT specialist, resulting in inconsistent approaches for attempting to maintain compliance with a privacy policy. As such, a more comprehensive database management system—with an alternative basis for performing privacy management operations—can improve computing operations and interfaces in database management systems.

Embodiments of the present disclosure provide a privacy compliance notification. The privacy compliance notification is an indication of a database's level of compliance with a privacy policy. The privacy compliance notification can specifically be generated after restoring the database to a backup copy of the database. The privacy compliance notification can be a message associated with a software or hardware means and components for delivering the message. The privacy compliance notification may be generated based on determining whether a privacy database operation associated with a database journal and a privacy journal has been executed (i.e., re-executed) on a database since the database was restored to a backup copy of the database. The privacy database operation that has not been executed on the database since the database was restored to a backup copy of the database can be identified using the database transaction journal and the privacy journal.

In operation, privacy is operationally integrated as a first-level data entity in a database platform (e.g., Structured Query Language database). As used herein, "a first-level data entity" refers to an entity which supports operations that facilitate other entities in a database. The privacy first-level data entity can refer to privacy entities that are generated and integrated into a database platform to support privacy database operations in a manner similar to pre-defined entities and data operations of the database platform. In this way, In the context of privacy, example first-level data entity include objects, functions, operations, aid relational database entities. In some contexts, the first-level data entity may be specific to a programming language, such as but not limited to Python, SQL, the C suite of programming languages, and so forth. Operations available to first-level data entity include the ability of being passed as an argument, returned as a function, modified, and assigned to a variable.

In one embodiment, system-level metadata is assigned to a data structure, such as a table, column (e.g., field), or corresponding row (e.g., records), for example, using data definition language (DDL) possible by way of the first-level data entity designation. In this manner, standard database DDL operations may be employed to assign certain data structures with privacy system-level metadata, simplifying the process for assigning privacy system-level metadata to target data structures. As used herein, "privacy system-level metadata" or "privacy system-level metadata properties" may refer to any tags or metadata assigned to any suitable data structure, indicating that the corresponding data structures are associated with information controlled by a privacy policy. For example, a column including "social security numbers" may be associated with privacy system-level metadata indicating that the entries in the column correspond to privacy data. As such, "privacy data" refers to any data that includes "privacy system-level metadata" or otherwise has been tagged with metadata indicating that the corresponding data structure includes privacy data. Control of privacy data may be regulated by a privacy policy.

By way of non-limiting example, a DDL operation for assigning privacy system-level metadata includes:

"ALTER TABLE table_name MODIFY column_name privacy=true"

causing privacy system-level metadata to be assigned the column defined in the MODIFY entry, which is associated with the table defined in the ALTER TABLE entry. Specifically, as provided in this example, "privacy=true" may be computer-readable script configured to assign the privacy system-level metadata to the column (e.g., column_name) of the table (e.g., table_name) defined in this exemplary line of code. In this manner, a computing system may identify a database operation performed on any entry in this column of this table as implicating privacy data because the privacy system-level metadata has been assigned to the column. Although this example includes assigning privacy system-level metadata to a column by way of written code, it should be understood that the privacy system-level metadata may be assigned by way of any suitable input or selection, including a selection made via drop down menu, text written into a data field, and so forth.

In addition, aspects of the present disclosure are directed to, among other things, providing a privacy compliance notification indicating a level of compliance with a privacy policy associated with a database. As used herein, a "level of compliance" indicates a degree of compliance achieved relative to the privacy policy. The level of compliance can be associated with computing logic for evaluating data (e.g., privacy database operations or a privacy journal) and determining a level of compliance with the privacy policy. For example, a binary levels of 0—compliant and 1—not compliant based on whether privacy data that should be deleted does not exist (compliant) or exists (not compliant) in the database. Other variations and combinations of levels of compliance as indicated by degree relative to the existence of privacy data in violation of the privacy policy are contemplated with embodiments of the present disclosure.

As discussed herein, the privacy compliance notification may include an indication of a level of compliance of a database with a privacy policy following a backup restoration restoring a backup copy of the database, such that the backup copy of the database may have restored privacy data previously requested to be removed by a user. The privacy compliance notification may include any suitable indication in any suitable format, such as an E-mail, an instant message, a browser notification, an integrated calendar notification, and the like. The privacy compliance notification may be generated and sent to any suitable personnel (or associated device), including a database administrator.

The privacy compliance notification may be generated based on identifying a privacy database operation, in a privacy journal, that has not been performed on the restored backup copy. The "privacy database operation" may refer to a database operation performed on a data structure, such as a field/column, record/row, or table, that is associated with the privacy system-level metadata. The "privacy journal" may refer to a transaction log or journal including a listing of the privacy database operations. The privacy journal may include a subset of the information in the database transaction journal. In one example, the privacy journal may include pointers, pointing to an entry in the database transaction journal that corresponds to the database operation performed on the data structure associated with privacy system-level metadata. For example, the pointers may correspond to a low-bit data structure, such as a transaction identifier ("ID"). In this manner, compliance with a privacy policy may be maintained within the privacy journal since the structure of entries in the privacy journal, such as the pointers, may omit any additional privacy data. Additionally, the low-bit structure of the privacy journal, such as the pointers, may improve speed in performing computations, such as identifying privacy database operations from the privacy journal that have not been executed on the copy of the database since restoration, as discussed below.

Moreover, computational resources associated with a database administrator executing operations on the backup copy of the database to manually ensure compliance are reduced because the privacy compliance notification may provide more specific instructions regarding a level of compliance. For example, the privacy compliance notification may indicate which privacy database operations of the privacy journal were executed after the backup copy was generated as part of a backup operation. Additionally or alternatively, the privacy compliance notification may indicate that the backup copy complies with the privacy policy based on the privacy journal not including any privacy database operations that have not been executed on the copy of the database since the backup restoration.

To illustrate an example of providing a privacy compliance notification, a database management engine of a database management system may execute a backup operation on a database (or file). At a first instance in time, the backup operation may cause a backup copy of the database and its corresponding database transaction journal to be stored at a first instance in time. At a second instance in time (after the first instance in time), a user may communicate a request to remove privacy data from the database. The database management engine may access the request to remove the user's privacy data and execute a delete statement to remove the privacy data from the database. The database management engine may store a transaction associated with the delete statement in the database transaction journal.

At a third instance in time (after the second instance in time), the database management engine may receive a request to initiate a backup restoration operation. The backup restoration operation may be received in response to detection of any target event, such as an error within the database. As a result, at the third instance in time, the database management system may restore the database to the backup copy of the database. Restoring the database to the backup copy of the database includes replacing the database and associated database transaction journal from the third instance in time with the database and associated database transaction journal of the first copy of the database (i.e., associated with the first instance in time).

In some embodiments, the database transaction journal from the third instance in time (before the backup restoration operation) may be saved in a storage device to facilitate determination of which privacy database operation have not been performed. To verify compliance with the privacy policy, the database management engine may compare (i) the database transaction journal that associated with the backup copy to (ii) the privacy journal. The database management engine may determine a database operation for attempting to remove privacy data in response to determining, based on the comparison, that the backup operation restored the previously deleted user's privacy data. Additionally or alternatively, the database management engine may determine and generate a privacy compliance notification indicative of a level of compliance of the database following the backup restoration.

As such, machine operations are more efficient when using the same, uniform underlying privacy-based database infrastructure in contrast to giving customers (for example, customers of a distributed computing system database solution) the freedom to manually, independently, and differently tag data structures, such as a field and record of a relational database. Indeed, additionally computational operations associated with translating inconsistent tagged data structures are reduced by employing the disclosed privacy-based database infrastructure.

Figure 1B:
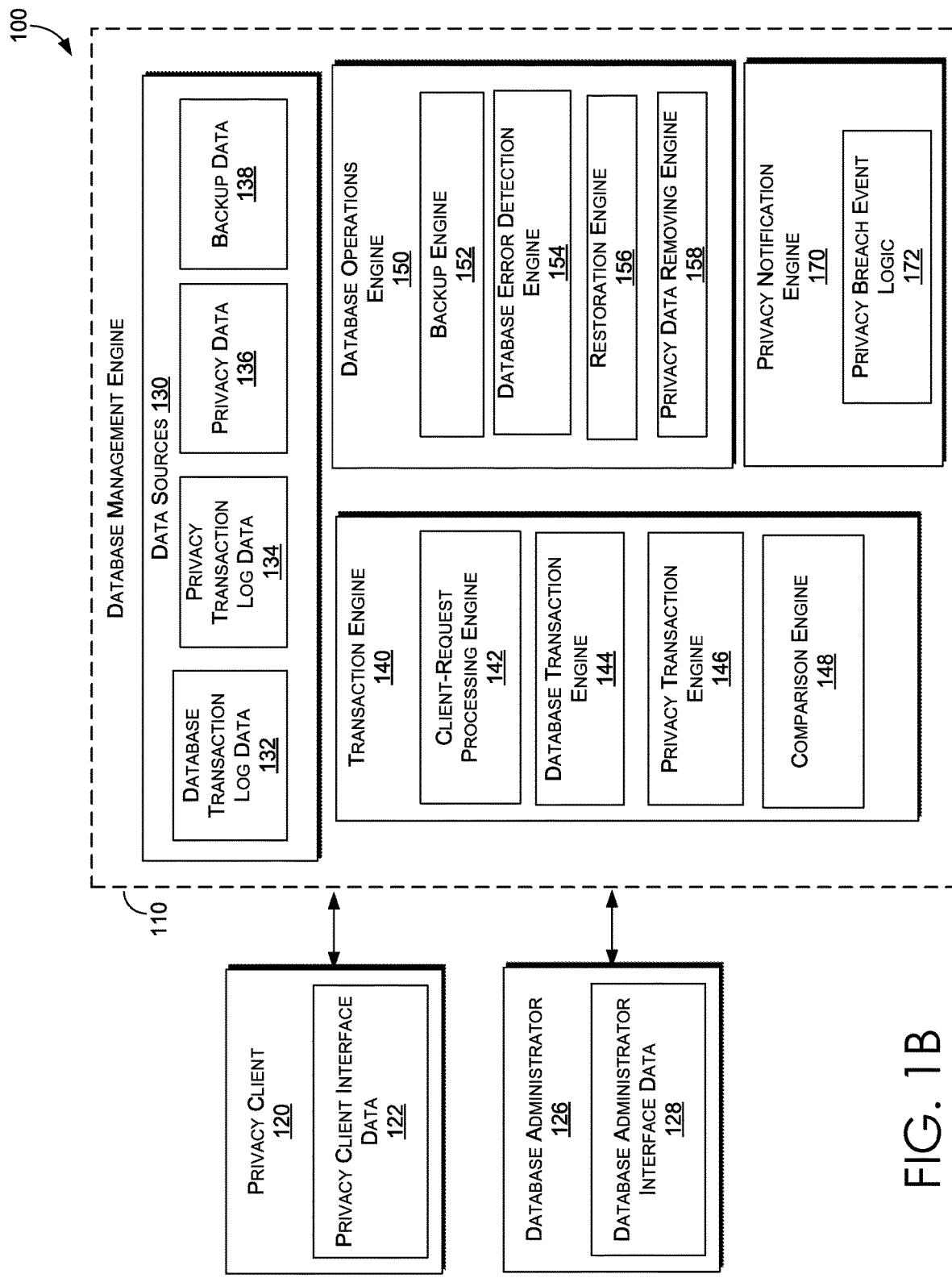
FIG. 1B is a block diagram of an exemplary schematic for generating a privacy compliance notification used to determine compliance with a privacy policy using a database management engine in a database management system, in accordance with aspects of the technology described herein.
Figure 1C:
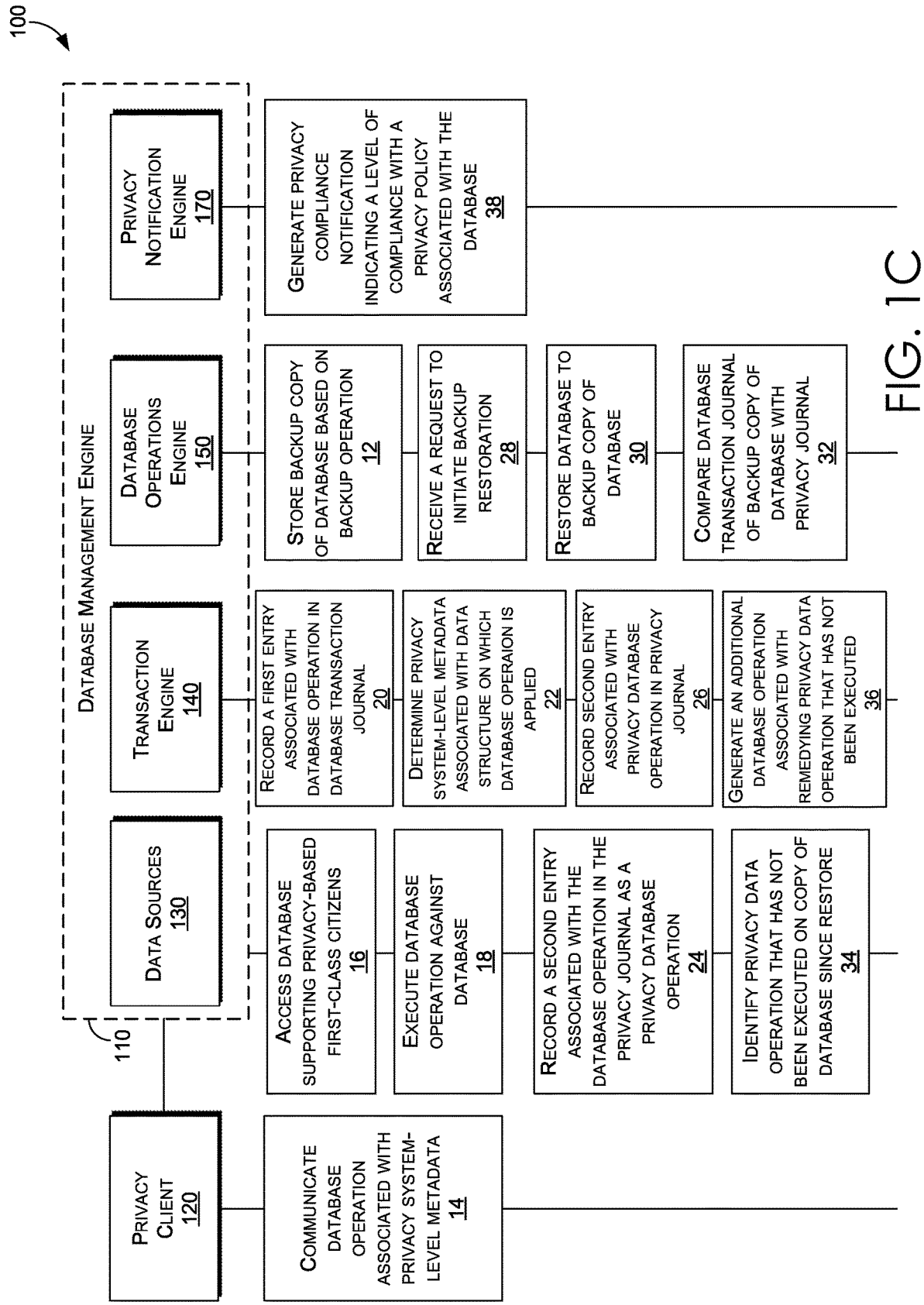
FIG. 1C an exemplary database management system configured to generating a privacy compliance notification within a database management system, in accordance with aspects of the technology described herein.

Aspects of the technical solution can be described by way of examples and with reference to FIG. 1A, FIG. 1B, and FIG. 1C. FIG. 1A illustrates a database management system 100 having a database management engine 110, a privacy client device 120, a database administrator device 126, and network 180. The database management engine includes data sources 130, transaction engine 140, database operations engine 150, and privacy notification engine 170.

With reference to FIG. 1B, FIG. 1B includes an exemplary database management system 100 for providing provide a privacy compliance notification using a database management engine in a database management system, in accordance with aspects of the technology described herein. FIG. 1B includes components that correspond to components described with reference to FIG. 1A. The database management system 100 further includes privacy client device 120 having privacy client interface data 122; database administrator device 126 having database administrator interface data; data sources 130 having database transaction log data 132, privacy transaction log data 134, privacy data 136, and backup data 138; the transaction engine 140 having client request processing engine 142, database transaction engine 144, and privacy transaction engine 146, and comparison engine 148; database operations engine 150 having backup engine 152, database error detection engine 154, restoration engine 156, privacy data removing engine 158; and privacy notification engine 170 having privacy breach event data 172.

The database management system 100 is configured to provide a privacy compliance notification in a database management system. The database management system 100 includes the database management engine 110 that operates with management engine clients (such as, the management engines of privacy client device 120 and database administrator device 126) and manages privacy compliance notifications and to provide the functionality described herein. The privacy client device 120 and/or the database administrator device 126 include client-side computing logic and instructions that complement and supplement the server-side computing logic and instructions of the database management engine 110 for providing the privacy compliance notification. For example, the database management system 110 can (1) perform operations based on the privacy-based first-class data entity and/or the privacy system-level metadata property and (2) provide interfaces for accessing, communicating, and generating interfaces associated with the privacy compliance notification, as described herein.

Database transaction log data 132, privacy transaction log data 134, privacy data 136, and backup data 138 can be stored and retrieved via data sources (e.g., data sources 130) of the database management system 100 and can include data that support providing the services associated with a database management system 100. For example, a database management system can support recording database operations (performed on a database) as the database transaction log data 132 and (performed on data structures of the database having privacy system-level metadata) as privacy transaction log data 134, where the database management system 100 is enabled to manage database transaction log data 132 and privacy transaction log data 134. Additional data (e.g., metadata) associated with the database transaction log data 132 and privacy transaction log data 134 can be tracked and stored.

With reference to FIG. 1C, depicted is an exemplary database management system 100 for providing a privacy compliance notification using a database management engine 110 in the database management system, in accordance with aspects of the technology described herein. FIG. 1C includes components that correspond to components described with reference to FIG. 1B. FIG. 1C includes privacy client 120 and database management engine 110 having data sources 130, transaction engine 140, database operations engine 150, and privacy notification engine 170.

Operationally, at block 12, the database operations engine 150 stores a backup copy of a database based on a backup operation. At block 14, the privacy client 120 communicates a database operation associated with privacy system-level metadata. At block 16, the database management engine 110 accesses the database supporting privacy-based first-class data entity; and at block 18, executes the database operation against the database supporting privacy-based first-class data entity. The privacy-based first-class data entity may include a privacy type associated with privacy management operations defined in a privacy policy. Alternatively or additionally, the privacy-based first-class data entity tracks privacy metadata associated with database operations, such that the privacy metadata is stored with a corresponding database operation in the privacy journal.

At block 20, the transaction engine 140 records a first entry associated with the database operation in a database transaction journal; at block 22, the transaction engine 140 determines privacy system-level metadata associated with data structure on which database operation is applied. At block 24, the database management engine 110 records a second entry associated with the database operation in the privacy journal as a privacy database operation. At block 26, the transaction engine records an entry associated with the privacy database operation in a privacy journal.

Figure 2A:
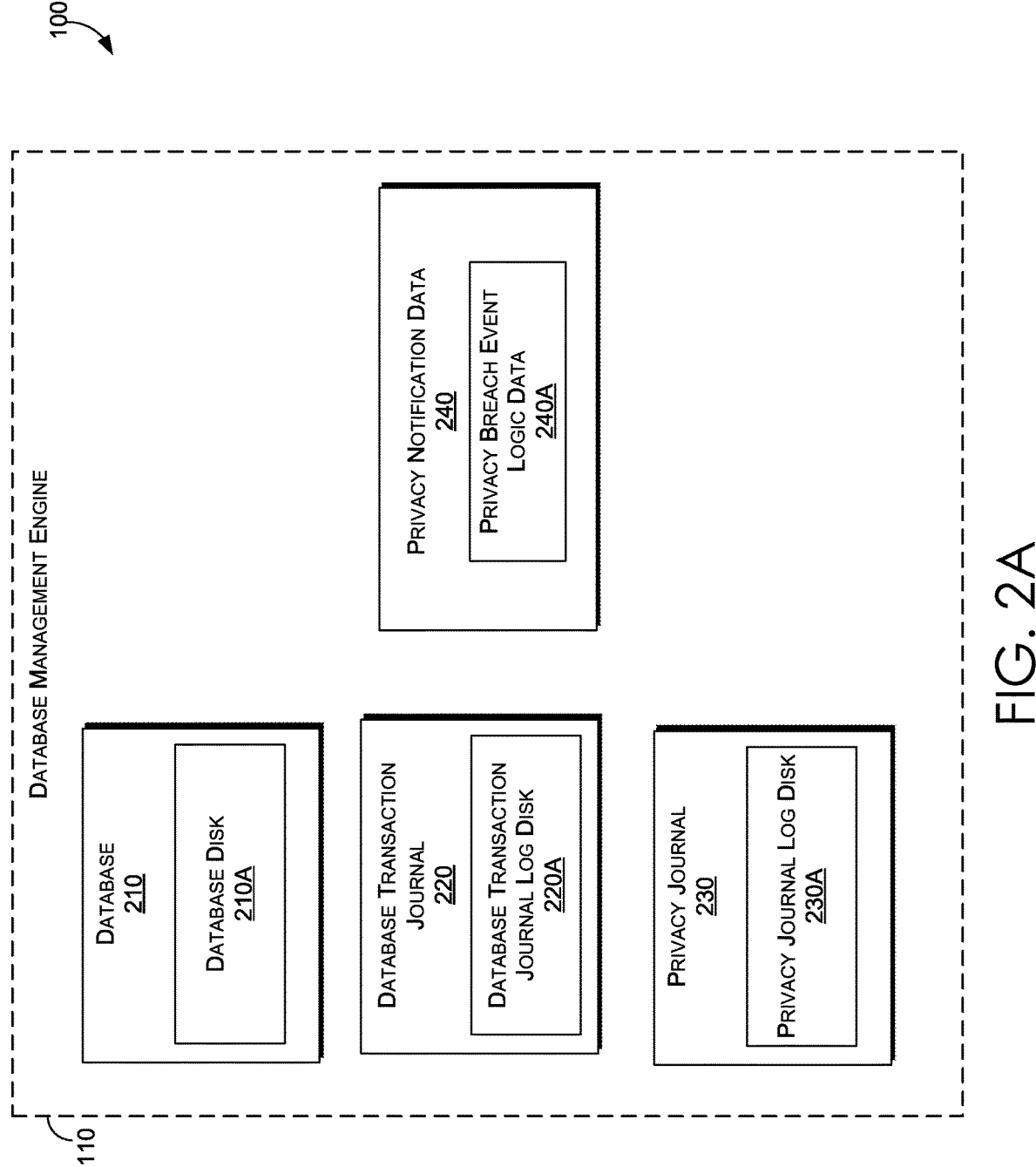
FIG. 2A is an exemplary database management system for storing database transactions in a database transaction journal and for storing privacy database transactions in a privacy journal using a database management engine in the database management system, in accordance with aspects of the technology described herein.

At block 28, the database operations engine 150 receives a request to initiate a backup restoration; at block 30, restores the database to a backup copy of the database; and at block 32, compares the database transaction journal of the backup copy of the database with the privacy journal. At block 34, the database management engine 110 identifies a privacy database operation that has not been executed on or against the copy of the database since restored. At block, 36, the transaction engine 140 generates an additional database operation associated with remedying (e.g., execute) the privacy database operation that has not been executed. At block 38, the privacy notification engine 170 generates a privacy compliance notification indicating a level of compliance with a privacy policy associated with the database.
Overview of Exemplary Environments for Providing Privacy Compliance Notifications Using a Database Management Engine in a Database Management System Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example database management system 100 in which methods of the present disclosure may be employed. In particular, FIG. 2A shows a high level architecture of the database management system 100 in accordance with implementations of the present disclosure.

Among other engines, managers, generators, selectors, or components not shown (collectively referred to herein as "components"), the technical solution environment of database management system 100 includes database management engine 110. As illustrated, the database management engine 110 may include a database 210 including database disk 210A, a database transaction journal 220 include a database transaction journal log disk 220A, a privacy journal 230 including database transaction journal log disk 240, privacy notification data 240 including privacy breach even logic data. As discussed below with respect to the database transaction log data 132 and the privacy transaction log data 134 of FIG. 2B, the database transaction journal 220 can log database operations in the database transaction journal log disk 220A. Similarly, the privacy journal 230 can log database operations as privacy database operations in the privacy journal log disk 230A and privacy notification data 240 can be generated based on privacy breach event logic data 240A

As such, the database management engine 110 may record transactions in the database transaction journal 220 and the privacy journal 230. For example, recording the database operation in the privacy journal 230 comprises recording a pointer in the privacy journal 230, the pointer pointing to an entry in a database transaction journal 220 that corresponds to the database operation. Furthermore, the database 210 may store any data, for example, privacy data 136 (of FIG. 2B) of a privacy client 120. Although the database 210 is depicted as being included in a data disk, while the database transaction journal 220 and the privacy journal 230 are depicted as being included in respective log disks, it should be understood that the database, the database transaction journal 220, and the privacy journal 230 may be stored in any suitable storage device or memory device, including but not limited to the features discussed with respect to FIGS. 6 and 7.

The database 210 may process database operations (e.g., requests to make changes to data stored in the database disk 210A). In some embodiments, the changes may include computer-readable script in any suitable database language syntax, such as SQL, for example. Taking SQL as an exemplary database language syntax, the changes to the database may result from any suitable commands, including but not limited to database operations included DDL, DML, data control language (DCL), transition control language (TCL), privacy data, and the like. As discussed in detail below with respect to the transaction engine 140, the database transaction journal 220 may include entries including database transaction log data 132; and the privacy journal 230 may include entries including privacy transaction log data 134. In operation, the privacy journal may include an indication of a privacy database operation performed on a data structure of the database 210. The privacy database operation may correspond to a database operation performed on a data structure (of the database 210) having privacy system-level metadata as discussed herein. In some embodiments, making changes to the privacy system-level metadata may be classified as database operation associated with privacy system-level metadata, such that making changes to the privacy system-level metadata may cause a corresponding entry to be recorded in the privacy journal 230 (and the database transaction journal 220). As discussed herein in more detail, the privacy notification data 240 and the privacy breach event log data 240A are associated with the privacy notification engine 170 and the privacy breach event logic 172 of FIG. 1B. The privacy notification data 240 and the privacy breach event logic data 240A are associate with determining whether a privacy database operation has not been executed on the database since the restore; and based on determining whether the privacy database operation has not been executed on the database since the restore, generating a privacy compliance notification associated with the database.

Figure 2B:
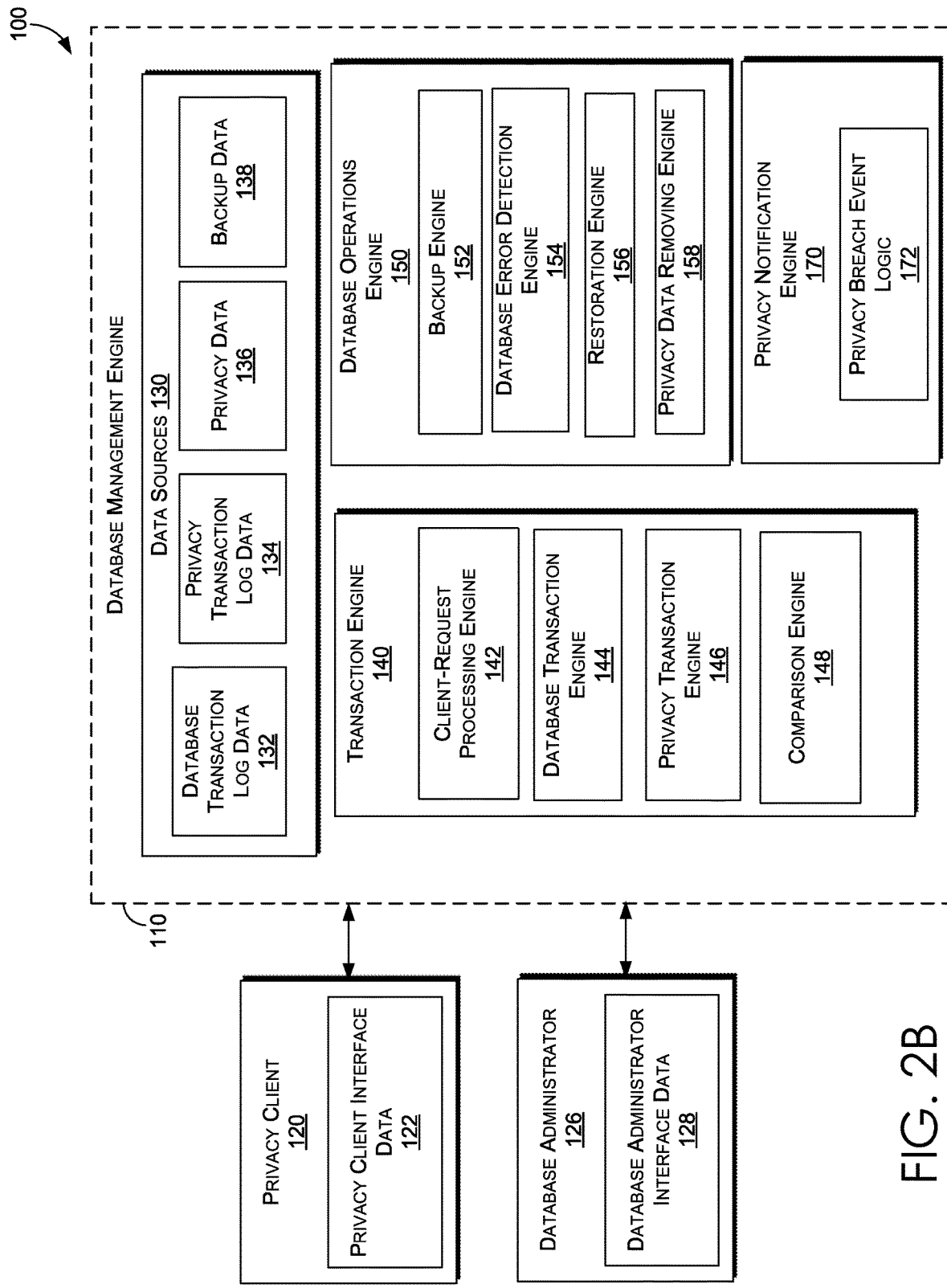
FIG. 2B is an exemplary database management system for generating a privacy compliance notification used to determine compliance with a privacy policy using a database management engine in the database management system, in accordance with aspects of the technology described herein.

Turning to FIG. 2B, depicted is an exemplary database management system 100 for providing provide a privacy compliance notification using a database management engine in a database management system, in accordance with aspects of the technology described herein. FIG. 2B includes components that correspond to components described with reference to FIG. 1B, but will now be discussed in more detail. In some embodiments, the database management system 100 may be implemented based on example environments described with reference to FIGS. 6 and 7 for use in implementing embodiments of the technical solution are shown.

The privacy client device 120 is configured to communicatively couple to the database management engine 110. The privacy client interface data 122 may be configured to cause the privacy client 120 to interact with features or services provided by the database management engine 110. In one embodiment, the privacy client interface data 122 may include logic to present graphical user interface (GUI) elements interactable to control data associated with the privacy client 120. For example, the GUI elements may include selectable icons, drop down menus, scripting interfaces, text blocks, tables, and so forth. In the context of the privacy client interface data 122 supporting SQL, the privacy client 120 may communicate a data definition language (DDL) command. As discussed below, because the database management engine 110 may support privacy-based first-class data entity, the privacy client 120 may submit user inputs, such as the DDL command, to associate particular data structures with privacy system-level metadata. Alternatively, in certain embodiments, the privacy client 120 may access data structures that have been configured by the database management engine 110 with privacy system-level metadata, such that the privacy client 120 may access and use tables that have been pre-configured with the privacy system-level metadata.

In some embodiments, the privacy client 120 may interact with a data structure, including any suitable data such as privacy data. Privacy data may include personal identification information ("PII"), medical records, media such as photographs, communications, financial information, and/or any other data associated with privacy system-level metadata, as discussed herein. As an example of the privacy client 120 interacting with a data structure, the privacy client 120 may communicate a request to remove certain privacy data 136 from the data sources 130. The request to remove the privacy data 136 may include a data manipulation language (DML) command, such as DELETE; a selection from a drop-down menu indicative of a request to delete; or any other suitable request communicated to the database management engine 110 to cause the database management engine 110 to delete the corresponding privacy data 136. Although the communication from the privacy client 120 is discussed in the context of a delete or removal operation, it should be understood that the database management engine 110 may receive any suitable database operation, including a database operation to be performed against a data structure (e.g., field or record) associated with privacy system-level metadata.

Continuing with FIG. 2B, the transaction engine 140 is configured to process requests from the privacy client 120 and the database administrator 126. The transaction engine 140 may process the requests to modify data, such as the privacy data 136, by generating a data manipulation command, such as the above-mentioned DML or DDL commands. In some embodiments, the transactions and/or operations associated with the requests that are executed against the data structures of the database are recorded as the database transaction log data 132 in the data source 130. The database transaction log data 132 may correspond to a database transaction log implemented as a separate file or set of files within the database or separate from the database. For example, the database transaction log data 132 may include a log cache that is managed separately from the database. In one embodiment, the database management engine 110 is configured to truncate the database transaction log data 132, such that space in the database transaction log is freed for reuse based on any number of factors, such as the occurrence of a checkpoint, a backup, and the like.

The database transaction log data 132 may include a log sequence number (LSN), including a unique ID for a log record. In one embodiment, the LSNs are assigned in monotonically increasing order, which facilitates maintaining a chronologically sequence listing of transaction in the database transaction log. Furthermore, the database transaction log data 132, may include a Prev LSN linking the corresponding transaction log to the last transaction log. In this manner, the transaction logs can similarly be chronologically related to each other. Additionally or alternatively, the database transaction log data 132 includes a transaction ID number which may correspond to a reference to the associated database operation generating the log record. The database transaction log data 132 may include an indication of the type of transaction log, such as an indication of whether the corresponding database operation included DDL, DML, DCL, TCL, privacy data, and the like.

In certain embodiments, when the database operation is executed against a data structure associated with privacy system-level metadata, information associated with the database operation may be stored as privacy transaction log data 134 and as the database transaction log data 132. In one embodiment, the privacy transaction log data 134 may include a pointer that refers to an entry of the transaction log. For example, the pointer may include a transaction ID, the points to a particular (and unique) entry within the database transaction log. By using a pointer, the privacy transaction engine 146 may be able to efficiently record and access for future processing an entry in the privacy transaction journal, as discussed below.

The client-request processing engine 142 of the transaction engine 140 may receive a request from a privacy client device 120 or a database administrator device 126 to assign privacy system-level metadata. As discussed herein, the database management engine 110 may make privacy a first-level first-class data entity, such that a privacy client 120 or a database administrator 126 is able to assign privacy system-level metadata in a uniform manner. As such, inconsistencies associated with contrasting approaches for assigning privacy system-level metadata can be reduced or altogether eliminated. For example, a privacy client may want to associate a column identified as "FirstName" located in a table identified as "Data" as a data structure containing privacy data. The privacy client 120 may communicate the following line of script to designate this column as a data structure including privacy data:

"ALTER TABLE FirstName MODIFY Data privacy=true"

In this manner, any database operation performed against a record contained in the "FirstName" field can be identified as a privacy database operation (i.e., a database operation performed on privacy data. It should be understood that instead of communicating a computer-readable script, the privacy client device 120 may communicate any request or selection indicative of a request to assign or modify privacy system-level metadata associated with any accessible data structure. For example, the privacy client 120 may communicate an E-mail asking for their first name to be removed from the database management system 100.

The client-request processing engine 142 of the transaction engine 140 is configured with computing logic to receive the database operation from the privacy client 120. As discussed above, the database operation or request communicated by the privacy client 120 may be formatted in any suitable manner. The client-requesting engine 142 may receive the request or database operation from the privacy client 120. In some embodiments, the client-requesting engine 142 (1) determines an operation to be performed and (2) determines a data structure in the database on which the operation should be performed. Furthermore, the client-requesting engine 142 may determine whether the determined data structure is associated with privacy system-level metadata. Determination of whether the data structure is associated with privacy system-level metadata may include accessing metadata associated with the data structure and determining whether the metadata corresponds to privacy system-level metadata. In response to determining that the data structure on which the database operation is to be performed is associated with privacy system-level metadata (and is therefore a privacy database operation), the client-request processing engine 142 may communicate the privacy database operation to the database transaction engine 144 and the privacy transaction engine 146.

On the other hand, in response to determining that the data structure on which the database operation is to be performed is not associated with privacy system-level metadata, the client-request processing engine 142 may communicate the database operation to the database transaction engine 144 and not to the privacy transaction engine 146. As such, in one embodiment, the privacy transaction engine 146 may only receive an indication of a database operation when the database operation is associated with privacy system-level metadata and therefore corresponds to a privacy database operation that is to be performed on privacy data.

In some embodiments, the database transaction engine 144 of the transaction engine 140 is configured with computing logic to execute a database operation. Continuing on the example above, in response to a request to delete privacy data (in this example, a first name of the privacy client), the database transaction engine 144 may perform the delete database operation on the target data structure. Performing the delete database operation may include removing the target privacy data 136 (in this example, the first name) from the data source 310. In some embodiments, complying with requests from privacy clients 120, such as request to remove privacy data 136, may be part of a privacy policy. Failing to comply with such requests from privacy clients 120 may render the database management system 100 in violation of the privacy policy. Although this example was discussed in the context of a delete database operation, it should be understood that embodiments of the present disclosure are not limited to delete database operations, as the database transaction engine 144 may execute any other suitable database operation.

Additionally, in some embodiments, the database transaction engine 144 is configured to record a corresponding database transaction in the database transaction journal 220 as database transaction log data 132. Continuing the example above, in response to receiving a request to delete privacy data 136, the database transaction engine may record, in the database transaction journal 220, an entry associated with the delete operation performed on the target data structure. As discussed above, the entry in the database transaction journal 220 may include an LSN, a Prev LSN, a transaction ID, a type of transaction, and the like.

Continuing with FIG. 2B, the privacy transaction engine 146 is configured with computing logic to record an entry in the privacy journal 230 (FIG. 2A) based on a determination of whether a database operation is performed on or against a data structure having or associated with privacy system-level metadata. The privacy transaction engine 146 may record the entry associated with the privacy database operation. In one embodiment, the privacy transaction engine 146 copies information from the corresponding entry in the database transaction journal 220 and records it in the privacy journal 230. For example, in response to the privacy database operation being performed, the privacy transaction engine 146 may copy the entire entry associated with the corresponding database operation from the database transaction journal 220. Alternatively, in response to the privacy database operation being performed, the privacy transaction engine 146 may copy a subset of the information of the entry associated with the corresponding database operation from the database transaction journal 220.

The comparison engine 148 is configured with computing logic to identify a privacy database operation that has not yet been performed against a restored backup copy of the database. In some embodiments, the comparison engine 148 determines a privacy database operation that has not been performed against the restored backup copy of the database based on a comparison of the privacy journal 230 and the database transaction journal 220. For example, the comparison engine 148 determines which entries in the privacy journal 230 that post-date the backup copy are included in the backup copy. Alternatively, the comparison engine 148 may determine which entries in the privacy journal 230 are not included in the database transaction journal 220 associated with the backup copy of the database. In this manner, the comparison engine 148 is able to determine which privacy database operations should be executed against the restored backup copy of the database to maintain compliance with the privacy policy.

In one embodiment, the comparison engine 148 operates to play-back database operations of the database transaction journal that were executed after the backup copy was generated. The comparison engine then detects an error in playing-back the database operations that triggers comparing un-played database operations in the database transaction journal to the privacy journal. Based on comparing the un-played database operations in the database transaction journal to the privacy, the comparison engine 148 identifies a privacy database operation in the privacy journal based on the privacy database operation matching an un-played database operation in the database transaction journal. As such, a privacy database operation that has not been executed since the database was restored is identified.

In some embodiments, the transaction engine 140 may cause a security mitigation action to be performed. The security mitigation action may correspond to any suitable computer operation that may bring the database into compliance with the privacy policy. In one embodiment, the transaction engine 140 may aggregate any data associated with the privacy database operation that has been determined to have not been performed on the restored backup copy of the database (as restored by the restoration engine 156, as discussed below). For example, the transaction engine 140 may aggregate the command associated with the database operation, the data structure the privacy database operation was executed against, and any other suitable information associated with the privacy database operation that has not been performed on the restored backup copy. The security mitigation action may be performed based on the aggregated data associated with the privacy database operation. Example security mitigation actions include providing instructions for remedying the lack of compliance with the privacy policy, instructions for performing a database operation, identification of data structure in the restored backup copy of the database, and so forth.

Continuing with FIG. 2B, the database operations engine 150 is configured with computing logic to execute a backup and determine privacy database operations to perform after restoration of a backup copy of the database. The backup engine 152 is configured to perform a backup operation. By performing a backup operation, the backup engine 152 may store a copy of the database from when the backup operation was performed. In some embodiments, performing the backup may include storing a copy of the database, as well as the database transaction journal 220 (and its corresponding entries) from the time the backup operation was performed. In this manner, a user (e.g., database administrator 126) seeking to make changes to the backup copy of the database may determine, based on the corresponding database transaction journal 220, which database operations have been incorporated into and performed against the database.

The backup engine 152 is configured with computing logic to perform a backup based on any suitable schedule. For example, the backup engine 152 may perform a backup periodically (e.g., every day, week, month, year, and so forth) or based on the occurrence of an event. For example, the database error detection engine 154 may notify the backup engine 152 the possibility of a security issue, such that the backup engine 152 performs the backup in response to receiving the notification from the database error detection engine.

Continuing with FIG. 2B, the database error detection engine 154 is configured with computing logic to detect an error in a database. The error in the database may include any operation that rendered the database temporarily or permanently unusable. The database error detection engine 154 may detect an error in response to an operation failing to be performed. For example, a database may have been generated with insufficient column width, such that inputs to the database result in an error. As another example, the indices of a table of the database may have been modified, such that other tables relying on the unmodified, original indices are unable to be used, such that the database is rendered unusable. As another example, a power outage in one data center caused deletion of data, such that database operations executed via other data centers are unable to be performed. Other example error include experiencing volume overflow, ignoring time zones, missing audit trains, ignoring collation, and so forth.

The restoration engine 156 is configured with computing logic to initiate and perform a backup restoration operation restoring the database to a backup copy of the database. In some embodiments, the restoration engine 156 performs the backup restoration operation based on the database error detection engine 154 detecting any error. Alternatively or additionally, the restoration engine 156 may perform the backup restoration operation based on a manual user input. As discussed herein, performing the backup restoration operation may include replacing the current database with the backup copy of the database that was stores as part of the backup operation. In some embodiments, the restoration engine 156 may replace only the data structures in the database that were changed or modified since the last backup restoration. Alternatively, the restoration engine 156 may replace the entire database with the backup copy of the database.

The privacy data removing engine 158 of the database operations engine 150 is configured with computing logic to execute the privacy database operation that were identified to have not been executed against the restored backup copy of the database. The privacy data removing engine 158 may receive an indication, from the comparison engine 148, of the privacy database transactions from the privacy journal 230 that have not been executed against the restored backup copy of the database. In some embodiments, the comparison engine 148 may communicate a pointer (e.g., the transaction ID) corresponding to the privacy database operation to be performed. The privacy data removing engine 158 may translate the pointer to a corresponding database operation and perform the database operation on the restored backup copy of the database. For example, the pointer may point to a transaction ID corresponding to an entry in the database transaction journal 220 of database before the backup restoration operation was performed. Therefore, the privacy data removing engine 158 may receive the pointer (e.g., transaction ID) and search for the corresponding database operation in the database transaction log data 132. In this manner, the privacy data removing engine 158 may attempt to execute privacy database operations against the restored backup copy of the database to attempt to maintain compliance with a privacy policy that may, for example, require the database management system to comply with request to remove privacy data.

Based on the comparison performed by the comparison engine 148 and the attempt to execute the privacy database operation performed by the privacy data removing engine 158, the privacy notification engine 170 may generate and communicate a privacy compliance notification. The privacy notification engine 170 is configured with computing logic to generate a privacy compliance notification indicative of a level of compliance with the privacy policy. In one embodiment, the privacy notification engine 170 may generate a privacy compliance notification indicating compliance with the privacy policy in response to the database transaction journal 220 including all entries of the privacy journal 230. This would indicate that all privacy database transactions were performed on the restored copy, as indicated by the entries in the database transaction journal 220.

In some embodiments, the privacy notification engine 170 may generate a privacy compliance notification indicating a lack of compliance with the privacy policy in response to the privacy journal 230 including entries that were not included in the database transaction journal 220. In addition, the privacy notification engine 170 may generate the privacy compliance notification to include the entries in the privacy journal 230, corresponding privacy database operations to be performed, and a status indicative of whether an attempt was made to perform the corresponding privacy database operation.

The privacy notification engine 172 may include privacy breach event logic 172 defining conditions under which the database or the restored backup copy of the database is or is not in compliance with the privacy policy. For example, the privacy breach event logic 172 may define conditions for compliance with various privacy policies. For example, a first privacy policy may require that health records are encrypted based on a government regulation, while a second privacy policy may require that a first name be removed upon request by the corresponding privacy client 120. The privacy compliance notification generated by the privacy notification engine 170 may provide which privacy policy the restored backup copy of the database fails to comply with.

The privacy notification engine 170 may communicate to the database administrator device 126 the privacy compliance notification. The database administrator 126 may receive the privacy compliance notification by way of a GUI generated on the database administrator device 126 based on the database administrator interface data 128.

Figure 3:
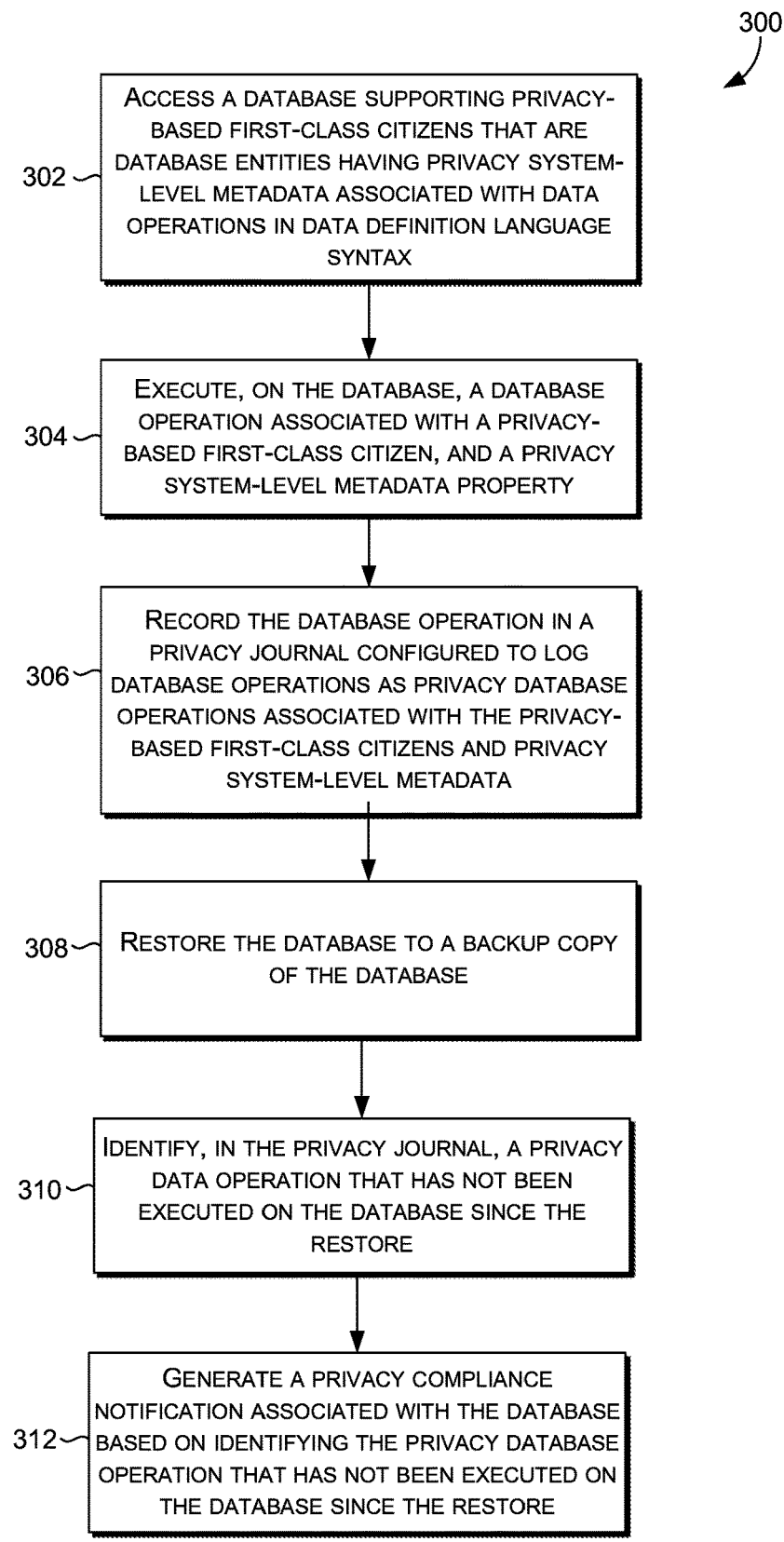
FIG. 3 provides a first exemplary method of generating a privacy compliance notification using a database management engine in a database management system, in accordance with aspects of the technology described herein.
Figure 4:
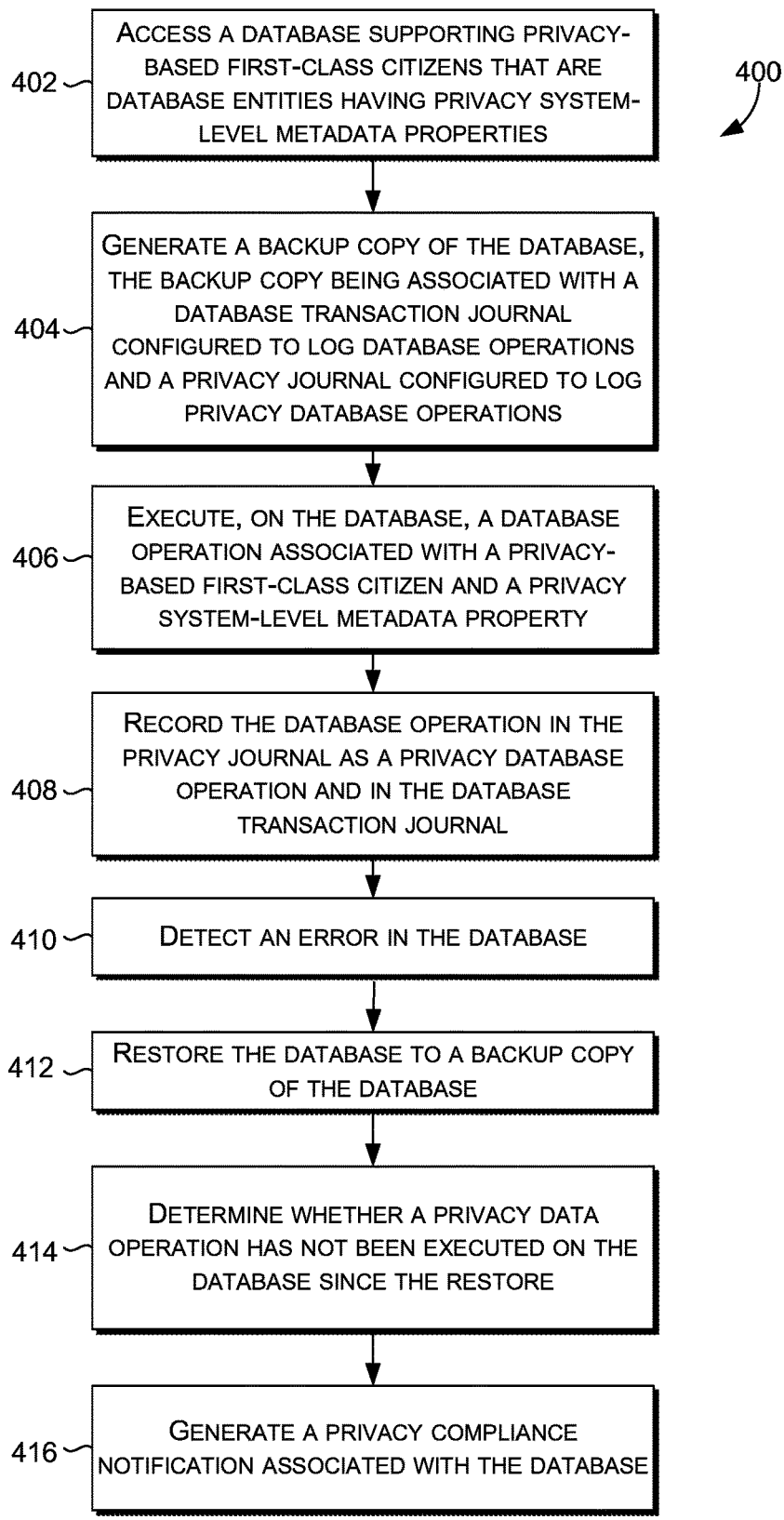
FIG. 4 provides a second exemplary method of generating a privacy compliance notification using a database management engine in a database management system, in accordance with aspects of the technology described herein.
Figure 5:
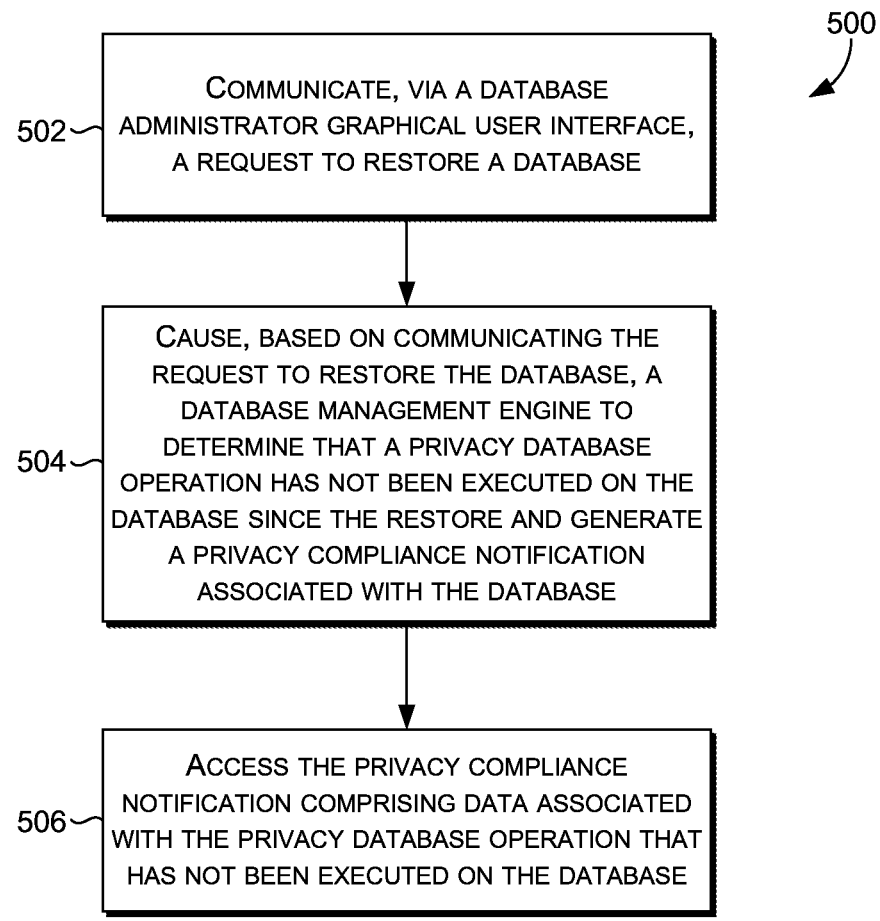
FIG. 5 provides a third exemplary method of generating a privacy compliance notification using a database management engine in a database management system, in accordance with aspects of the technology described herein.

With reference to FIGS. 3-5, flow diagrams are provided illustrating methods associated with generating a privacy compliance notification using a database management engine 110 (FIGS. 1-2) in a database management system 100 (e.g., FIGS. 1-2). In some embodiments, one or more components of the database management system 100, the privacy client 120 (FIGS. 1-2), and/or the database administrator 126 are configured to perform the methods illustrated in FIGS. 3-5. In some embodiments, one or more computer-storage media having computer-executable or computer-useable instructions embodied thereon that, when executed, by one or more processors can cause the one or more processors to perform the methods (e.g., computer-implemented method) in the database management system 100 (e.g., a computerized system or computing system).

Turning to the process 300 illustrated in FIG. 3, the database management engine 110 may access (block 302) a database supporting privacy-based first-class data entity that are database entities having privacy system-level metadata associated with data operations in data definition language syntax. The database management engine 110 may execute (block 304), on the database 210 (FIG. 2A), a database operation associated a privacy-based first-class data entity, and a privacy system-level metadata property. The privacy-based first-class data entity may include a privacy type associated with privacy management operations defined in a privacy policy and/or may track privacy metadata associated with database operations. The privacy metadata is stored with a corresponding database operation in the privacy journal 230 (FIG. 2A).

Additionally, the database management engine 110 may record (block 306) the database operation in a privacy journal 230 configured to log database operations as privacy database operations associated with privacy-based first-class data entity and privacy system-level metadata. The database management engine 110 may restore (block 306) the database to a backup copy of the database. Based on restoring (block 306) the database to the backup copy, the database management engine 110 may identify (block 310), in the privacy journal 230, a privacy database operation that has not been executed on the database 210 since the restoration. Based on identifying (block 310) the privacy database operation that has not been executed on the database 210 since the restore, generating (block 312) a privacy compliance notification associated with the database 210. The privacy compliance notification may provide a level of compliance with the privacy policy. In some embodiments, a database administrator 126 (FIGS. 1-2) may manually remedy issues resulting in a lack of compliance based on the privacy compliance notification.

Turning to process 400 illustrated in FIG. 4, the database management engine 110 may access (block 402) a database that supports privacy-based first-class data entity, which may correspond to database entities having privacy system-level metadata properties associated with data operations in data definition language syntax. The database management engine 110 may generate (block 404) a backup copy of the database 210 (FIG. 2A), the backup copy is associated with a database transaction journal 220 (FIG. 2A) configured to log database operations and a privacy journal 230 (FIG. 2A) configured to log privacy database operations associated with privacy-based first-class data entity and privacy system-level metadata. The database management engine 110 may execute (block 406), on the database 210, a database operation associated with a privacy-based first-class data entity, a privacy system-level metadata property, and/or privacy metadata.

Continuing with FIG. 4, the database management engine 110 may record (block 408) the database operation in the privacy journal 230 as a privacy database operation and in the database transaction journal 220. The database management engine 110 may detect (block 410) an error in the database 210; and based on detecting (block 410) the error in the database, restore (block 412) the database to a backup copy of the database 210.

The database management engine 110 may determine (block 414) that a privacy database operation has not been executed on the database since the restore. In one embodiment, determining (block 412) that the privacy database operation has not been executed on the database since the restore is based on (1) playing-back database operations of the database transaction journal 220 that were executed after the backup copy was generated, (2) detecting an error in playing-back the database operations, (3) comparing un-played database operations in the database transaction journal 220 to the privacy journal 230; and (4) identifying the privacy database operation in the privacy journal 230 based on the privacy database operation matching an un-played database operation in the database transaction journal 220. Playing-back the database operations may include attempting to perform the privacy database operations on the restored backup copy of the database in any suitable order. For example, the privacy database operations may be performed in order of most recently performed to least recently performed or may be ordered from least recently performed to most recently performed.

The database management engine 110 may generate (block 416) a privacy compliance notification associated with the database. Although the processes 300 and 400 of FIGS. 3 and 4 are discussed as being performed by the database management engine of FIGS. 1 and 2, it should be understood that any suitable component capable of processing computer-readable instructions may be configured to perform these processes.

Turning to FIG. 5, process 500 includes accessing (block 502) a database administrator GUI. The database administrator GUI may be generated based on the database administrator interface data 128 (FIG. 1B). The process 500 includes communicating (block 502), via a database administrator graphical user interface, a request to restore a database. In some embodiments, process 500 may be implemented by the database administrator device 126 (FIGS. 1-2). A database administrator client associated with the database administrator graphical user interface causes (block 504) based on communicating the request to restore the database, a database management engine to determine that a privacy database operation has not been executed on the database since the restore and generate a privacy compliance notification associates with database. The database administrator client access (506) the privacy compliance notification comprising data associated with the privacy operation that has not been executed on the database.

Technical Improvement and Literal Support for Claims

Methods, systems, and computer storage media for providing a privacy compliance notification indicative of a database's level of compliance with a privacy policy. In some embodiments, a computerized system is provided. The computerized system includes one or more computer processors and computer memory storing computer-useable instructions that, when used by the one or more computer processors, cause the one or more computer processors to perform operations. The operations include accessing, at a database management engine, a database that supports a plurality of privacy-based first-class data entities, the privacy-based first-class data entity are database entities having privacy system-level metadata properties associated with data operations in a database language syntax. The operations include executing a database operation on the database, the database operation is associated with a privacy-based first-class data entity and a privacy system-level metadata property. The operations include, based on executing the database operation, recording, in a privacy journal, the database operation, such that the privacy journal is configured to log database operations as privacy database operations associated with the privacy-based first-class data entities and the privacy system-level metadata property. The operations include restoring the database to a backup copy of the database. The operations include based on restoring the database to the backup copy, identifying, in the privacy journal, a privacy database operation that has not been executed on the database since the restore; and based on identifying the privacy database operation that has not been executed on the database since the restore, generating a privacy compliance notification associated with the database. Advantageously, these and other embodiments, as described herein, provide improved technologies to computer systems for improving the efficiency of achieving database compliance with a privacy policy, and may reduce CPU cycles and reducing network bandwidth by automating the identification of privacy database operations. For example, existing approaches may include facilitating database compliance with a privacy policy may by assigning a dedicating information-technology (IT) specialists to the task of ensuring database compliance with a privacy policy. These dedicated IT specialists may be burdened with manually parsing through data structures and databases to identify breaches of the privacy policy. However, this manual process of identifying breaches of privacy policy can be burdensome, inefficient, and result in data structures that fail to comply with the privacy policy being overlooked. Additionally, the low-bit structure of the privacy journal, such as the pointers, may improve speed in performing computations, such as identifying privacy database operations from the privacy journal that have not been executed on the copy of the database since restoration, as discussed herein.

In any combination of the above embodiments, database operation includes a data definition language (DDL) command, a relational database entity, and a value for the privacy system-level metadata property.

In any combination of the above embodiments, a first privacy-based first-class data entity is a privacy type associated with privacy management operations defined in a privacy policy, and a second privacy-based first-class data entity tracks privacy metadata associated with database operations, such that the privacy metadata is stored with a corresponding database operation in the privacy journal.

In any combination of the above embodiments, recording the database operation in the privacy journal includes recording a pointer in the privacy journal, the pointer pointing to an entry in a database transaction journal that corresponds to the database operation.

In any combination of the above embodiments, identifying the privacy database operation that has not been executed on the database since the restore is based on detecting an error in playing-back database operations in a database transaction journal of the database, such that the privacy journal includes a subset of database operations in the database transaction journal.

In any combination of the above embodiments, identifying the privacy database operation that has not been executed on the database since the restore is based on: (1) playing-back database operations of a database transaction journal that were executed after the backup copy was generated; (2) detecting an error in playing-back the database operations; (3) comparing un-played database operations in the database transaction journal to database operations in the privacy journal; and (4) identifying the privacy database operation in the privacy journal based on the privacy database operation matching an un-played database operation in the database transaction journal.

In any combination of the above embodiments, the privacy compliance notification indicates that the database is not compliant because the privacy database operation has not been executed on the database since the restore.

In some embodiments, one or more computer-storage media having computer-executable instructions embodied thereon that, when executed by a computing system having a processor and memory, cause the processor to access, at a database management engine, a database that supports a plurality of privacy-based first-class data entity, the privacy-based first-class data entity database entities having privacy system-level metadata properties associated with data operations in data definition language syntax. The computer-executable instructions cause the processor to generate a backup copy of the database, the backup copy is associated with a database transaction journal configured to log database operations and a privacy journal configured to log privacy database operations associated with the privacy-based first-class data entity and the privacy system-level metadata properties. The computer-executable instructions cause the processor to execute a database operation on the database, the database operation is associated with a privacy-based first-class data entity and a privacy system-level metadata property. The computer-executable instructions cause the processor to, based on executing the database operation, record, in the database transaction journal and the privacy journal, the database operation, the database operation is recorded in the privacy journal as a privacy database operation. The computer-executable instructions cause the processor to detect an error in the database; based on detecting the error in the database, restore the database to the backup copy of the database; based on restoring the database to the backup copy, determine whether a privacy database operation has not been executed on the database since the restore; based on determining whether the privacy database operation has not been executed on the database since the restore, generate a privacy compliance notification associated with the database; and cause a security mitigation action to be performed. Advantageously, these and other embodiments, as described herein, provide improved technologies to computer systems for improving the efficiency of achieving database compliance with a privacy policy, and may reduce CPU cycles and reducing network bandwidth by automating the identification of privacy database operations. For example, existing approaches may include facilitating database compliance with a privacy policy may by assigning a dedicating information-technology (IT) specialists to the task of ensuring database compliance with a privacy policy. These dedicated IT specialists may be burdened with manually parsing through data structures and databases to identify breaches of the privacy policy. However, this manual process of identifying breaches of privacy policy can be burdensome, inefficient, and result in data structures that fail to comply with the privacy policy being overlooked. Additionally, the low-bit structure of the privacy journal, such as the pointers, may improve speed in performing computations, such as identifying privacy database operations from the privacy journal that have not been executed on the copy of the database since restoration, as discussed herein.

In any combination of the above embodiments, the database operation includes a data definition language (DDL) command, a relational database entity, and a value for the privacy system-level metadata property.

In any combination of the above embodiments, a first privacy-based first-class data entity is a privacy type associated with privacy management operations defined in a privacy policy, and a second privacy-based first-class data entity tracks privacy metadata associated with database operations, such that the privacy metadata is stored with a corresponding database operation in the privacy journal.

In any combination of the above embodiments, recording the database operation in the privacy journal includes recording a pointer in the privacy journal, the pointer points to an entry in the database transaction journal that corresponds to the database operation.

In any combination of the above embodiments, determining that the privacy database operation has not been executed on the database since the restore is based on: (1) playing-back database operations of the database transaction journal that were executed after the backup copy was generated; (2) detecting an error in playing-back the database operations; (3) comparing un-played database operations in the database transaction journal to the privacy journal; and (4) identifying the privacy database operation in the privacy journal based on the privacy database operation matching an un-played database operation in the database transaction journal.

In any combination of the above embodiments, the instructions further cause the processor to: determine that there are no privacy database operations in the privacy journal that have not been executed on the database since the restore; and based on determining that there are no privacy database that have not been executed on the database since the restore, generate the compliance notification that indicates that the database is compliant because that are no privacy database operations that have not been executed on the database since the restore.

In any combination of the above embodiments, the instructions further cause the processor to: determine that a privacy database operation has not been executed on the database since the restore; and based on determining that the privacy database operation has not been executed on the database since the restore, generate the compliance notification indicates that the database is not compliant because the privacy database operation has not been executed on the database since the restore.

In some embodiments, a computer-implemented method is provided and includes: accessing, at a database management engine, a database that supports a plurality of privacy-based first-class data entities, the privacy-based first-class data entities are database entities having privacy system-level metadata properties. The computer-implemented method includes, based on a restoration operation executed on the database to a backup copy of the database, identifying, in a privacy journal, a privacy database operation that has not been executed on the database since the restore. The computer-implemented method includes, based on identifying privacy database operation that has not been executed on the database since the restore, causing a security mitigation action to be performed. Advantageously, these and other embodiments, as described herein, provide improved technologies to computer systems for improving the efficiency of achieving database compliance with a privacy policy, and may reduce CPU cycles and reducing network bandwidth by automating the identification of privacy database operations. For example, existing approaches may include facilitating database compliance with a privacy policy may by assigning a dedicating information-technology (IT) specialists to the task of ensuring database compliance with a privacy policy. These dedicated IT specialists may be burdened with manually parsing through data structures and databases to identify breaches of the privacy policy. However, this manual process of identifying breaches of privacy policy can be burdensome, inefficient, and result in data structures that fail to comply with the privacy policy being overlooked. Additionally, the low-bit structure of the privacy journal, such as the pointers, may improve speed in performing computations, such as identifying privacy database operations from the privacy journal that have not been executed on the copy of the database since restoration, as discussed herein.

In any combination of the above embodiments, the privacy system-level metadata properties are associated with data operations in data definition language (DDL) syntax, such that a database operation includes a DDL command, a relational database entity, and a value for the privacy system-level metadata property.

In any combination of the above embodiments, a first privacy-based first-class data entity is a privacy type associated with privacy management operations defined in a privacy policy; and a second privacy-based first-class data entity that tracks privacy metadata associated with the database operations, such that the privacy metadata is stored with a corresponding database operation in the privacy journal.

In any combination of the above embodiments, the privacy database operation in the privacy journal is a pointer in the privacy journal, the pointer points to an entry in a database transaction journal that corresponds to a database operation executed on the database.

In any combination of the above embodiments, identifying the privacy database operation that has not been executed on the database since the restore is based detecting an error in playing-back database operations in a database transaction journal of the database, wherein the privacy journal includes a subset of database operations in the database transaction journal.

In any combination of the above embodiments, causing a security mitigation operation to be performed includes, generating a privacy compliance notification associated with the database, such that the privacy compliance notification indicates that the database is not compliant because the privacy database operation has not been executed on the database since the restore.

ADDITIONAL SUPPORT FOR DETAILED DESCRIPTION OF THE INVENTION

Example Distributed Computing System Environment

Figure 6:
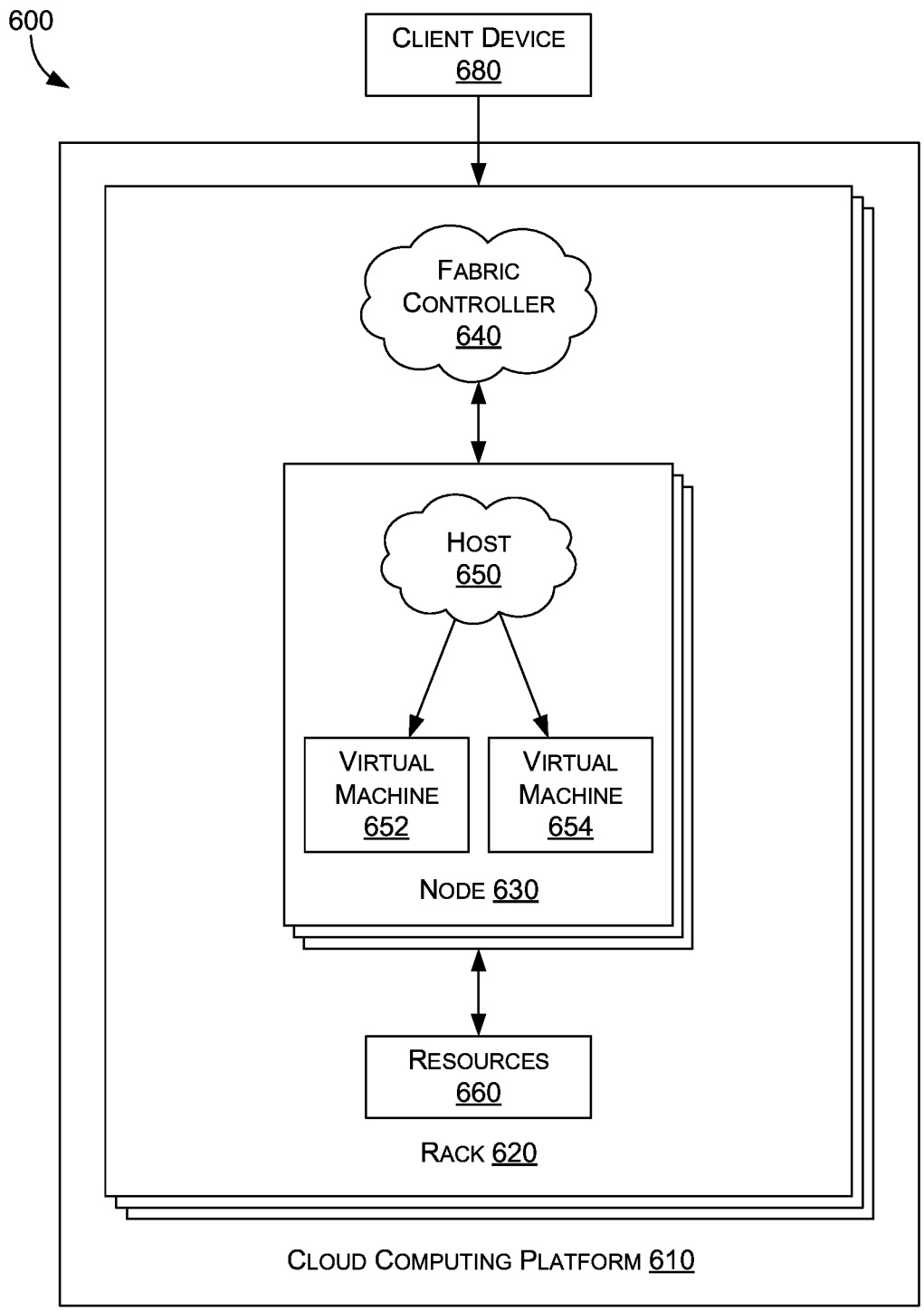
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Distributed Computing Environment

Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
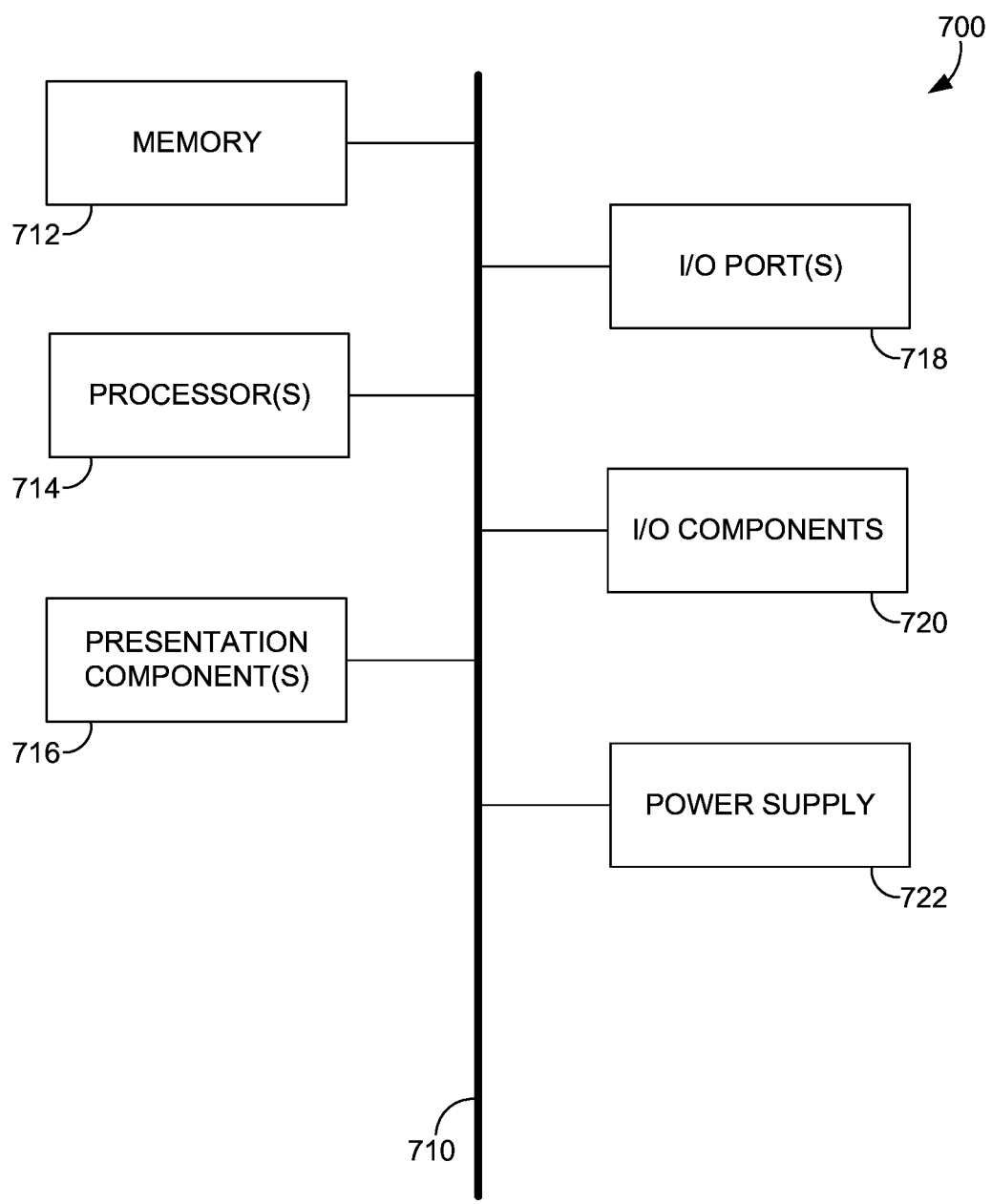
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may include computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:
one or more computer processors; and
computer memory storing computer-useable instructions that, when used by the one or more computer processors, cause the one or more computer processors to perform operations comprising:

accessing, at a database management engine, a database that supports a privacy-based first-class data entity having at least one privacy system-level metadata property;

executing at a respective timestamp a privacy database operation on the database, the privacy database operation is associated with the privacy-based first-class data entity and a privacy system-level metadata property, the privacy database operation comprises at least one of a data definition language (DDL) command, a data control language (DCL) command, a transition control language (TCL) command, a command specifying a relational database entity, or a command specifying a value for the privacy system-level metadata property;

based on executing the privacy database operation, recording, in a privacy journal, the privacy database operation, wherein the privacy journal is configured to log the privacy database operation associated with the privacy-based first-class data entity and the privacy system-level metadata property;

restoring the database to a backup copy of the database corresponding to a backup version of the database having an earlier timestamp prior to the respective timestamp;

based on restoring the database to the backup copy, identifying, in the privacy journal, the privacy database operation that has the respective timestamp later than the earlier timestamp of the backup copy of the database and that has not been executed on the database since the restore; and based on the earlier timestamp, the respective timestamp, and the identification of the privacy database operation that has not been executed on the database since the restore, generating a privacy compliance notification specifying that the database is noncompliant.

2. The system of claim 1, wherein the privacy compliance notification indicates that the database is not compliant because the privacy database operation has not been executed on the database since the restore.

3. The system of claim 1, wherein a first privacy-based first-class data entity is a privacy type associated with privacy management operations defined in a privacy policy; and
wherein a second privacy-based first-class data entity tracks privacy metadata associated with privacy database operations, wherein the privacy metadata is stored with a corresponding privacy database operation in the privacy journal.

4. The system of claim 1, wherein recording the privacy database operation in the privacy journal comprises recording a pointer in the privacy journal, the pointer pointing to an entry in a database transaction journal that corresponds to the privacy database operation.

5. The system of claim 1, wherein identifying the privacy database operation that has not been executed on the database since the restore is based on detecting an error in playing-back database operations in a database transaction journal of the database, wherein the privacy journal comprises a subset of database operations in the database transaction journal.

6. The system of claim 1, wherein identifying the privacy database operation that has not been executed on the database since the restore is based on:

playing-back database operations of a database transaction journal that were executed after the backup copy was generated;
detecting an error in playing-back the database operations;
comparing un-played database operations in the database transaction journal to a plurality of privacy database operations in the privacy journal; and
identifying the privacy database operation in the privacy journal based on the privacy database operation matching an un-played database operation in the database transaction journal.

7. One or more computer-storage media having computer-executable instructions embodied thereon that, when executed by a computing system having a processor and memory, cause the computing system to:
access, at a database management engine, a database that supports a privacy-based first-class data entity having at least one privacy system-level metadata property;
generate a backup copy of the database at an earlier timestamp, the backup copy is associated with a database transaction journal configured to log at least one database operation and a privacy journal configured to log at least one privacy database operation associated with the privacy-based first-class data entity and the at least one privacy system-level metadata property;
execute, at a respective timestamp later than the earlier timestamp, a database operation on the database, the database operation is associated with the privacy-based first-class data entity and the at least one privacy system-level metadata property, the database operation comprises at least one of a data definition language (DDL) command, a data control language (DCL) command, a transition control language (TCL) command, a command specifying a relational database entity, or a command specifying a value for the privacy system-level metadata property;
based on executing the database operation, record, in the database transaction journal and the privacy journal, the database operation, the database operation is recorded in the privacy journal as a privacy database operation;
subsequent to the database operation being executed a the respective timestamp, detect an error in the database;
based on detecting the error in the database, restore the database to the backup copy of the database generated at the earlier timestamp;
based on restoring the database to the backup copy, determine that the privacy database operation has not been executed on the database since the restore;
based on the earlier timestamp, the respective timestamp, and determining that the privacy database operation has not been executed on the database since the restore, generate a privacy compliance notification specifying that the database is noncompliant; and
cause a security mitigation action to be performed.

8. The media of claim 7, wherein the privacy-based first-class data entity comprises:
a first privacy-based first-class data entity that is a privacy type associated with privacy management operations defined in a privacy policy, and
a second privacy-based first-class data entity that tracks privacy metadata associated with database operations, wherein the privacy metadata is stored with a corresponding privacy database operation in the privacy journal.

9. The media of claim 7, wherein recording the database operation in the privacy journal comprises recording a pointer in the privacy journal, the pointer points to an entry in the database transaction journal that corresponds to the database operation.

10. The media of claim 7, wherein determining that the privacy database operation has not been executed on the database since the restore is based on:
playing-back database operations of the database transaction journal that were executed after the backup copy was generated;
detecting an error in playing-back the database operations;
comparing un-played database operations in the database transaction journal to the privacy journal; and
identifying the privacy database operation in the privacy journal based on the privacy database operation matching an un-played database operation in the database transaction journal.

11. The media of claim 7, wherein the computer-executable instructions further cause the processor to:
determine that there are no privacy database operations in the privacy journal that have not been executed on the database since the restore; and
based on determining that there are no privacy database that have not been executed on the database since the restore, generate the compliance notification that indicates that the database is compliant because that are no privacy database operations that have not been executed on the database since the restore.

12. The media of claim 7, wherein the computer-executable instructions further cause the processor to:
determine that a privacy database operation has not been executed on the database since the restore; and
based on determining that the privacy database operation has not been executed on the database since the restore, generate the compliance notification indicates that the database is not compliant because the privacy database operation has not been executed on the database since the restore.

13. A computer-implemented method, comprising:
accessing, at a database management engine, a database that supports a privacy-based first-class data entity having a privacy system-level metadata property;
based on a restoration operation executed on the database to restore the database to a backup copy of the database associated with an earlier timestamp, identifying, in a privacy journal, a privacy database operation that has a respective timestamp later than the earlier timestamp associated with the backup copy of the database and that has not been executed on the database since the restore, wherein the privacy database operation comprises at least one of a data definition language (DDL) command, a data control language (DCL) command, a transition control language (TCL) command, a command specifying a relational database entity, or a command specifying a value for the privacy system-level metadata property; and
based on the earlier timestamp, the respective timestamp, and identifying privacy database operation that has not been executed on the database since the restore, causing a security mitigation action to be performed.

14. The method of claim 13, wherein the privacy system-level metadata properties are associated with data operations formatted in DDL, structured query language (SQL), DLC, or TLC syntax.

15. The method of claim 13, wherein a first privacy-based first-class data entity is a privacy type associated with privacy management operations defined in a privacy policy; and wherein a second privacy-based first-class data entity that tracks privacy metadata associated with database operations, wherein the privacy metadata is stored with a corresponding privacy database operation in the privacy journal.

16. The method of claim 13, wherein the privacy database operation in the privacy journal is a pointer in the privacy journal, the pointer points to an entry in a database transaction journal that corresponds to a database operation executed on the database.

17. The method of claim 13, wherein identifying the privacy database operation that has not been executed on the database since the restore is based detecting an error in playing-back database operations in a database transaction journal of the database, wherein the privacy journal comprises a subset of database operations in the database transaction journal.

18. The method of claim 13, wherein causing a security mitigation operation to be performed comprises generating a privacy compliance notification associated with the database, wherein the privacy compliance notification indicates that the database is not compliant because the privacy database operation has not been executed on the database since the restore.

19. The system of claim 1, wherein the operations further comprise determining that the privacy database operation not having been executed on the database since the restore is noncompliant with a privacy policy, wherein the privacy compliance notification is generated based on the noncompliance with the privacy policy.

20. The system of claim 1, wherein the operations further comprise generating a security mitigation action, wherein generating the security mitigation action comprises at least one of:
aggregating data associated with the privacy database operation that has been determined to have not been performed on the backup copy of the database;
generating instructions indicative of a database operation performed on the database; or
performing the database operation.

* * * * *